United States Patent

[11] 3,581,840

| [72] | Inventors | Charles M. Hirst, Jr.;<br>Eugene C. Lipshield, both of Moberly, Mo. |
|------|-----------|---|
| [21] | Appl. No  | 865,394 |
| [22] | Filed     | Oct. 10, 1969 |
| [45] | Patented  | June 1, 1971 |
| [73] | Assignee  | Orscheln Brake Lever Mfg. Company<br>Moberly, Mo. |

[54] HYDRAULICALLY OPERABLE LOCKING MECHANISM FOR TILT CAB VEHICLES
10 Claims, 6 Drawing Figs.

[52] U.S. Cl............................................. 180/89,
296/35
[51] Int. Cl........................................ B62d 27/00
[50] Field of Search................................ 180/89, 82,
82.2; 296/35, 35.1, 28.21; 298/23, 23 M; 292/110,
111

[56] References Cited
UNITED STATES PATENTS

| 3,279,559 | 10/1966 | Hirst, Jr.......................... | 180/89 |
| 3,497,257 | 2/1970 | Hirst............................... | 296/35 |

FOREIGN PATENTS

| 1,152,898 | 8/1963 | Germany...................... | 296/35 |

Primary Examiner—Kenneth H. Betts
Assistant Examiner—John P. Silverstrim
Attorney—Lawrence E. Laubscher ABSTRACT: Improved hydraulically operable means for locking together the sections of a tilt cab vehicle, characterized by the provision of a jam-responsive means preventing movement of the locking mechanism to the completely locked condition when the cab section is twisted or cocked slightly from the fully seated position relative to the chassis frame. In the preferred embodiment, in addition to the known link means and bellcrank cam means for operating a hook member between fully locked, safety and fully released positions relative to a fixed pin member, a clevis member is provided that is operable when the tilt cab section is improperly oriented relative to the chassis frame for preventing erroneous movement of the spring-biased bellcrank cam means to the fully locked condition.

PATENTED JUN 1 1971

INVENTORS
CHARLES M. HIRST, JR.
BY   EUGENE C. LIPSHIELD

Lawrence C. Laubscher
ATTORNEY

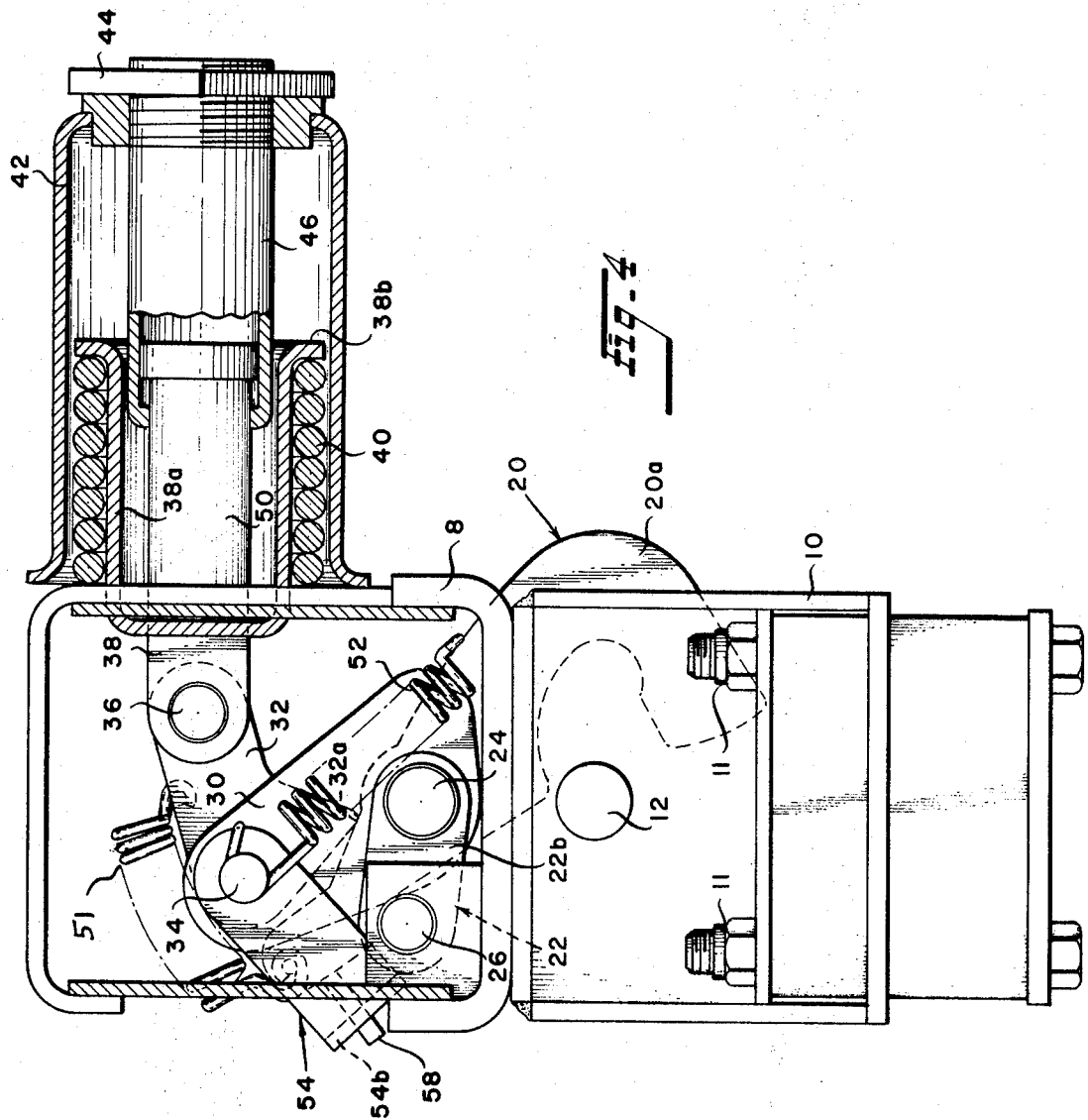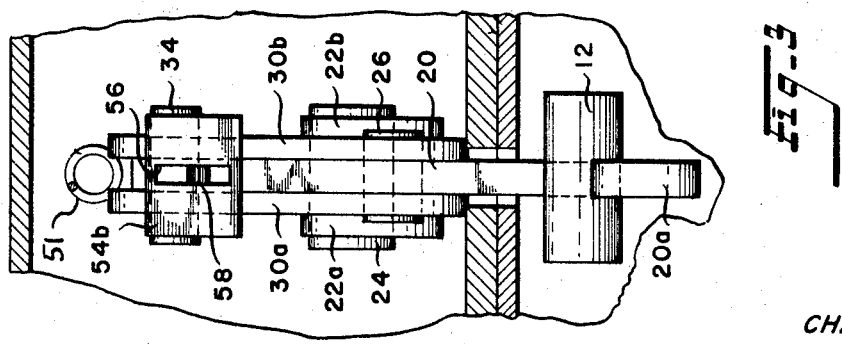

INVENTORS
CHARLES M. HIRST, JR.
EUGENE C. LIPSHIELD
BY

Lawrence C. Laubscher
ATTORNEY

HYDRAULICALLY OPERABLE LOCKING MECHANISM FOR TILT CAB VEHICLES

In the prior U.S. Pat. No. 3,279,559 of C. M. Hirst, Jr. issued Oct. 18, 1966, there is disclosed a cushioning and locking mechanism for tilt cab vehicles including bellcrank cam means for initially displacing a hook member axially from a locked position relative to a fixed locking pin to a safety position spaced from the pin, and for subsequently pivoting the locking member to a fully released position relative to the pin. In the copending application Ser. No. 750,863 filed Aug. 7, 1968, of the same inventor entitled "Tilt Cab Lock Actuator," an improved locking system is disclosed that is operable hydraulically by piston-cylinder motor means, thus permitting remote control operation of the tilt cab-locking means.

In actual practice, one drawback to the know tilt cab-locking apparatus is that in vehicles having a plurality of separate lock devices for locking a tilt cab to the chassis frame, when the tilt cab is twisted or slightly cocked relative to the chassis frame (such as might occur when one wheel of the vehicle is on a curb or in a rut), the lock member housing of one or more locking devices is prevented from coming into fully seated contiguous engagement with the corresponding lock pin housing, with the undesirable result that the locking mechanism is erroneously tripped to the fully locked condition even though the lock hook member is not fully engaged with the lock pin. Consequently although the unit gives the appearance of being in the fully locked condition, in actuality there is no locking engagement whatsoever between the tilt cab lock components.

The primary object of the present invention is to provide improved tilt cab-locking means of the type described above, including jam-responsive means operable when the tilt cab section is incompletely seated on the vehicle chassis to prevent the locking mechanism from being erroneously actuated to the fully locked condition. More particularly, clevis means are provided for preventing movement of the spring-biased link means and bellcrank arm cam means—that normally move a hook member between completely locked, safety and fully released positions relative to a fixed lock pin member—from being operable to the fully locked condition when the hook and pin housings are slightly space and the hook member is in jammed engagement with the pin member.

A more specific object of the invention is to provide jam-responsive means of the type described above including an actuator link connected between the bellcrank cam means and a reciprocatory actuator member that is normally spring biased in a direction to place the tilt cab lock means in the locked condition. The clevis jam-responsive means comprises a U-shaped member the legs of which are pivotally connected at their free ends with the pivot connection between the actuator link and the bellcrank cam means, said clevis member having a base or bridging portion between the legs that defines a stop that is engaged by the hook lock member when in the jammed condition, whereby movement of the bellcrank cam means to the fully locked condition is prevented. Pin and slot means provide limited movement between the hook-locking member and the clevis member so that the clevis serves as a stop only when the tilt cab is improperly seated on the chassis frame and the hook member is in the jammed condition.

A further object of the invention is to provide a hydraulically operable locking mechanism for a tilt cab vehicle, including piston-cylinder motor means for operating a reciprocatory actuator member against relatively strong mainspring means that normally bias the mechanism toward the locked condition, jam-responsive means being provided that automatically prevent return of the locking means to the normally locked condition when the tilt cab has been improperly seated on the chassis frame.

Other objects and advantages of the invention will become apparent from a study of the following specification when viewed in the light of the accompanying drawing, in which:

FIG. 3 is a sectional view taken along line 3-3 of FIG. 2;

FIGS. 4 and 5 illustrate the locking means of FIG. 2 when in the fully released and safety positions, respectively.

Figure 1:
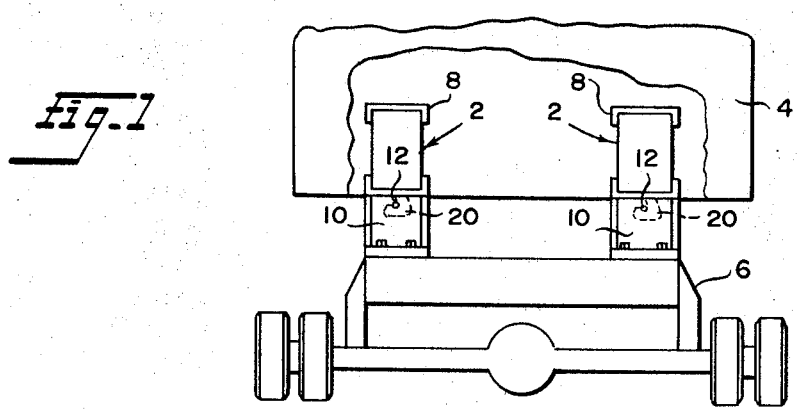
FIG. 1 is a diagrammatic illustration of the manner in which a plurality of locking devices of the present invention are utilized to lock together the sections of a tilt cab vehicle.

Referring first more particularly to FIG. 1, the apparatus of the present invention relates to transversely spaced locking means 2 for locking the tilt cab 4 of a vehicle to the chassis frame 6 as disclosed in the aforementioned Hirst U.S. Pat. No. 3,279,559. Each of the locking devices includes vertically arranged hook and pin housings 8 and 10, respectively, that are normally in contiguous engagement when the tilt cab is properly seated on the chassis frame.

Figure 2:
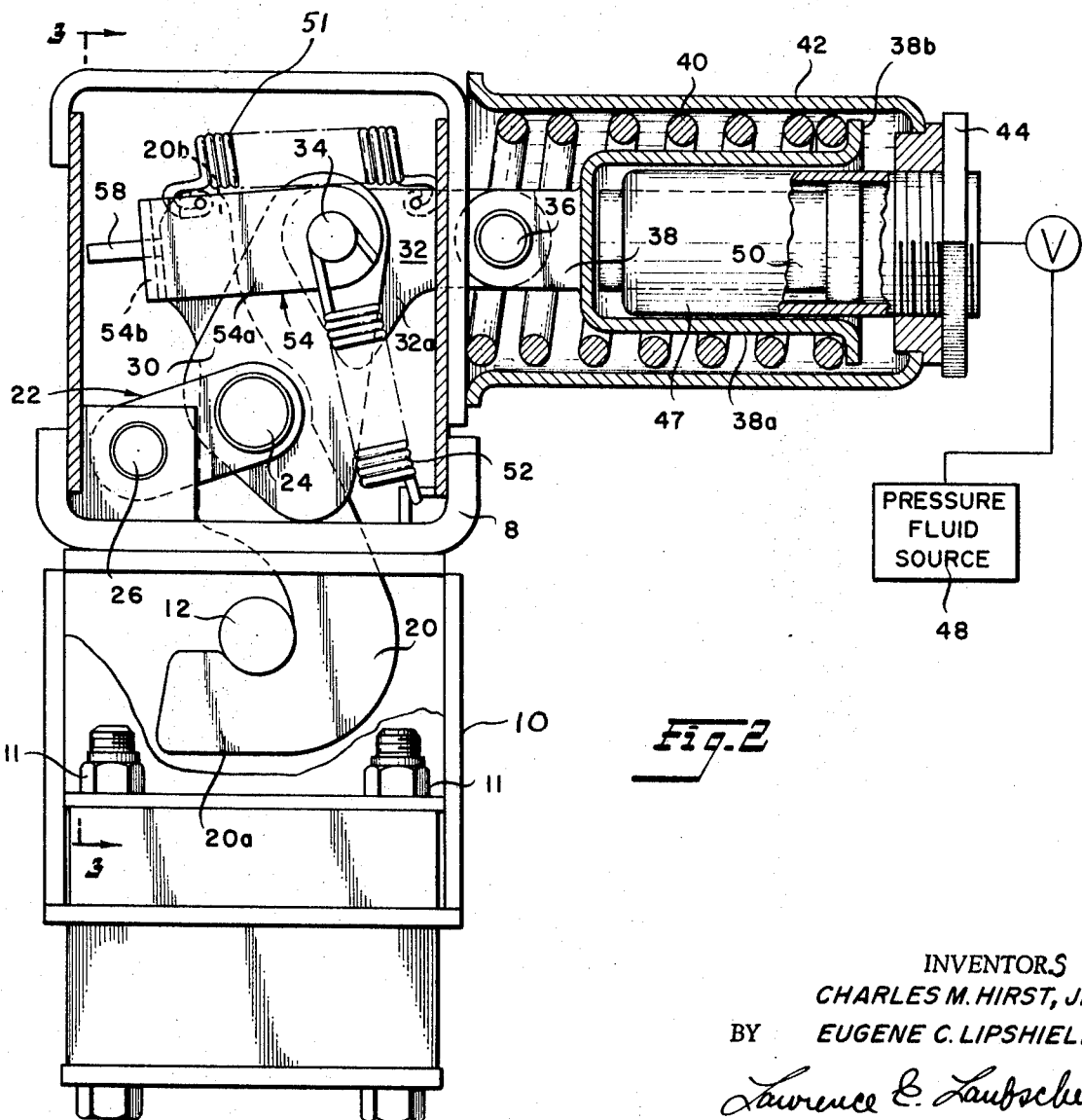
FIG. 2 is a sectional view of one of the locking devices when in the fully locked condition.

Referring now more particularly to FIG. 2, the lower pin housing 10 that is connected by bolts 11 to the chassis frame contains a transverse lock pin 12 supported at its ends by the housing sidewalls and arranged beneath mating slots 14, 16 contained in the bottom wall of the upper housing 8 and the top wall of the lower housing 10. Connected with the upper housing 8 for movement between locked, safety and fully released positions relative to the pin 12 is a hook member 20 having at its lower end a hook portion 20a. More particularly, the hook member 20 is pivotally connected intermediate its ends with one end of link means 22 by pivot pin 24, the other end of the pivot means being pivotally connected by pivot pin 26 with the upper housing 8. Also pivotally connected at one end with the pivot pin 24 is bellcrank cam means 30 the other end of which is pivotally connected with actuator link 32 by pivot pin 34. As shown in FIG. 3, the link means 22 includes a pair of spaced sections 22a, 22b arranged on opposite sides of the hook member, and the bellcrank cam means 30 comprises a pair of spaced sections 30a, 30b arranged on opposite sides of the inner surfaces of the link sections. Actuator link 32 is pivotally connected at its other end by pin 36 with the reciprocatory actuator member 38. The actuator member 38 includes a cylindrical drive cap portion 38a that is provided at its free end with a peripheral flange 38b. Compression main spring 40 reacts between the housing 8 and the flange portion 38b to bias actuator member 38 to the right. Arranged concentrically about the actuator drive cap portion 38b is a generally tubular spring housing 42 that is secured (for example, by bolt means, not shown) at one end to the housing 8. Threadably connected with the other end of the spring housing 42 is a hydraulic piston-cylinder motor 46 the stationary cylinder 47 of which is supplied with pressure fluid from the fluid source 48 to operate the piston 50 and thereby displace the actuator member against the force of spring biasing means 40 to unlock the hook member 20 from the pin 12 as will be described below.

Connected between the upper portion 20b of the hook member 20 and the actuator link 32 is a tension hook spring 51 which spring normally biases hook member 20 in the clockwise direction about pivot pin 24. An additional tension spring 52 connected between pin 34 and the housing 8 biases the bellcrank assembly toward the condition shown in FIG. 2.

In accordance with the present invention, jam-responsive means are provided that are operable, as will be described below, to prevent clockwise movement of cam means 30 toward the hook-locked position when the hook 20 is in an improper jammed, unlocked condition relative to the pin 12. To this end, a U-shaped clevis member 54 is provided having spaced leg portion 54a that straddle the bellcrank cam sections and are pivotally connected with the pin 34, said clevis member including a base portion 54b that defines a stop surface arranged opposite the upper end 20b of hook member 20. The base portion 54b of the clevis contains a slot 56 that receives a clevis retaining pin 58 that extends from the hook upper end portion 20b, whereby the clevis follows generally the pivotal movement of hook member 20.

The tilt cab locking means is released from the locked condition of FIGS. 1 and 2 to the fully released condition of FIG.

4 by operation of the hydraulic motor means 46. More particularly, when the piston 50 is extended by the supply of pressure fluid to the cylinder 47, actuator 38 is displaced to the left as shown in FIG. 4 to initiate counterclockwise rolling movement of the bellcrank cam means about its lower edge relative to the bottom wall of housing 8, whereupon link means 22 is pivoted downwardly in the clockwise direction to axially displace hook member 20 downwardly, whereby hook portion 20a lowered to a spaced safety position relative to the fixed pin 12. Upon further movement of piston 50 and actuator member 38 to the left, the lower protuberance portion 32a of actuator link 32 engages a corresponding surface on the hook upper end portion 20b to pivot hook member 20 in the counterclockwise direction relative to pin 24 toward the fully released position relative to pin 12 illustrated in FIG. 4. When all of the locking devices 10 of FIG. 1 are in this unlocked condition, the cab is free for pivotal movement to the tilted position relative to the chassis frame, as is conventional in the art.

Figure 5:
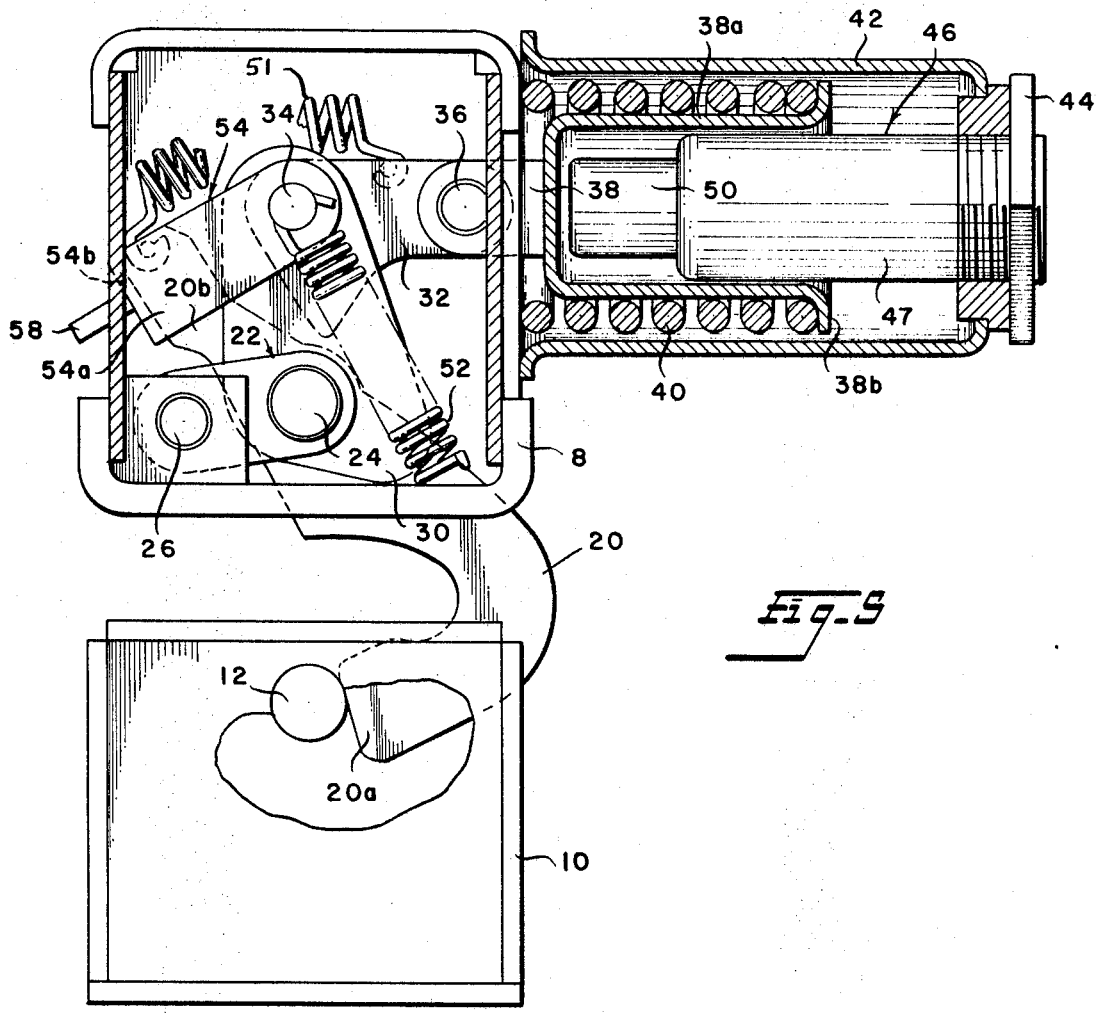

Following completion of the inspection and/or servicing of the vehicle engine contained beneath the cab, the cab is tilted in the opposite direction toward its initial seated position relative to the chassis frame. In the event that the tilt cab is improperly returned to its initial seated position (as might occur, for example, when one wheel of the vehicle is in a rut or on a curb to effect a degree of lateral cocking or twisting of the cab relative to the frame), one or more of the locking devices might have the condition illustrated in FIG. 5 wherein the housings 8 and 10 are slightly vertically spaced, whereupon when the hydraulic fluid is bled off from the cylinder 47, the actuator member 38 is shifted toward the right by the main spring 40 with the result that the lower hook portion 20a of hook member 20 is improperly jammed against the pin 12. As actuator member 38 and actuator link 32 are displaced to the right, clevis 54 is brought from the disengaged position of FIG. 4 to the engaged position of FIG. 5 relative to the upper portion 20b of the hook member 20b, whereupon the clevis stop portion 54 b engages the adjacent movement of the hook member. Since the lower end 20a of hook member 20 is in locked engagement with pin 12 and since the pivotal connection 34 between clevis 54 and actuator connecting link 32 is biased downwardly by spring 34, actuator 38 and actuator link 32 are locked against further right hand movement by the main spring 40. Thus, the bellcrank cam means 30 are prevented from being rolled in the clockwise direction about the lower cam surface toward the fully locked position illustrated in FIG. 1 (and correspondingly, the link means 22 are prevented from being undesirably pivoted in the counterclockwise direction about pin 26 to the locked position of FIG. 1). Therefore, movement of cam 30 and linkage means 22 is prevented that otherwise would give an observer the erroneous impression that the hook was fully locked relative to the pin while in actuality the hook would be in an unlocked condition relative to the pin (or even possibly in an incorrect position in which the back edge of the hook member is displaced to the left of the pin 12). Once the jam-causing condition is removed (i.e., when the vehicle is again leveled and the upper housing 8 is lowered into contiguous engagement with the lower section 10), mainspring 40 operates to pivot cam means 30 to lock the hook member 20 with the pin 12 the cam means 30 being rolled in the clockwise direction upon the cam toe as shown in FIG. 1.

Figure 6:
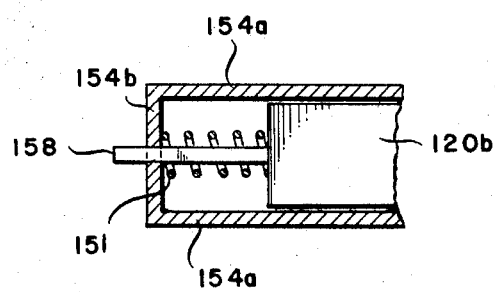
FIG. 6 is a detailed view of a modified construction of the hook-biasing spring means of FIG. 1.

While the hook spring 51 has been illustrated as being a tension spring connected between the hook upper portion 20b and the actuator link 32, in accordance with the alternate embodiment of FIG. 6, the hook spring means may comprise a compression spring 151 contained between the base portion 154b of the clevis member 154 and the hook upper end portion 120b. In this embodiment, the spring tends to bias the hook member in the clockwise direction away from the clevis and toward the locked position relative to the pin 12.

While in accordance with the provisions of the Patent Statutes, the preferred forms and embodiments have been illustrated and described, it will be apparent that other changes and modifications may be made without deviating from the concepts of the present invention.

We claim:

1. In a tilt cab lock assembly for contiguously locking together a pair of housings, including a transverse pin secured to one of said housings; a hook member; link means connecting said hook member with the other one of said housings, said hook member having at one end a hook portion adapted for locking engagement with said pin, said link means being pivotable from a first position in which the hook member is in locked engagement with said pin to a second position in which the hook member is axially displaced to a safety position immediately opposite but spaced from said pin; hook spring means biasing said hook member in the pin-locking direction relative to said link means; and actuator means for initially pivoting said link means from the first position to the second position to axially displace the hook member from the locked position to the safety position, and for subsequently pivoting the hook member relative to said link means from the safety position to a completely released position relative to said pin, said actuator means including a linearly operable actuator member, and bellcrank cam means pivotally connected between said actuator member and that end of said link means that is pivotally connected with said hook member, respectively; and main spring means for biasing said actuator means to pivot said link means toward the first position;

the improvement which comprises jam-responsive means operable to maintain said link means in the second position when the housings are in slightly spaced relation and when the hook member is maintained by engagement with said pin in an intermediate jammed position between the locked and released positions, thereby preventing undesired axial movement of said hook member in the locking direction relative to said second housing.

2. Apparatus as defined in claim 1, and further wherein said actuator means includes an actuator connecting link pivotally connected between said actuator member and said bellcrank, and third spring means biasing the pivotal connection between said cam means and said actuator connecting link in a direction to pivot said link means toward said first position.

3. Apparatus as defined in claim 2, wherein said link means are pivotally connected at one end with an intermediate portion of said hook member, and further wherein said jam-responsive means includes stop means connected with the pivotal connection between said cam means and said actuator connecting link for engaging the end of the hook member remote from said hook portion to limit the pivotal movement of said hook member in the unlocking direction relative to said link means, whereby owing to the biasing force of said third spring means and the jammed engagement between said pin and the hook portion of said hook member, rolling movement of said bellcrank cam means in a direction causing pivotal movement of said link means toward the first position is prevented.

4. Apparatus as defined in claim 3, wherein said stop means comprise a U-shaped clevis member the leg portions of which straddle the remote end portion of said hook member and are pivotally connected with the pivotal connection between said actuator connecting link and said cam means, the base portion of said U-shaped clevis member defining a stop surface adapted for engagement by the remote end of said hook member.

5. Apparatus as defined in claim 4, and further including means for limiting the extent of pivotal movement of said clevis member about its pivotal connection with said actuator connecting link and said cam means relative to the said remote end of said hook member.

6. Apparatus as defined in claim 5, wherein said limiting means comprise pin and slot means including a pin member extending from the remote end of said hook member through a corresponding slot contained in the base portion of said clevis member.

7. Apparatus as defined in claim 2, wherein said link means are pivotally connected at one end with an intermediate portion of said hook member, and further wherein said hook spring means comprise tensile spring means connected between the end of said hook member remote from said hook portion and said actuator means.

8. Apparatus as defined in claim 4, wherein said hook spring means comprises a compression spring arranged between the base portion of said clevis member and the said remote end of said hook member.

9. Apparatus as defined in claim 2, wherein said actuator member is arranged for reciprocation in an opening contained in said second housing, and further wherein said mainspring means comprise compression spring mans arranged externally of said second housing for cooperation between said second housing and the free end of said actuator member, respectively.

10. Apparatus as defined in claim 9, wherein said actuator means further includes piston and cylinder hydraulic motor means for displacing said actuator member in the hook-releasing direction against the biasing force of said mainspring means.